United States Patent  (10) Patent No.: US 12,246,201 B2
Kang  (45) Date of Patent: Mar. 11, 2025

(54) FIRE EXTINGUISHING APPARATUS OF VEHICLE

(71) Applicants: HYUNDAI MOTOR COMPANY, Seoul (KR); KIA CORPORATION, Seoul (KR)

(72) Inventor: Kyung Wan Kang, Jeonju-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 455 days.

(21) Appl. No.: 17/730,445

(22) Filed: Apr. 27, 2022

(65) Prior Publication Data

US 2023/0021876 A1 Jan. 26, 2023

(30) Foreign Application Priority Data

Jul. 23, 2021 (KR) .................. 10-2021-0096772

(51) Int. Cl.
A62C 3/07 (2006.01)
A62C 3/16 (2006.01)
A62C 31/28 (2006.01)
B05B 15/70 (2018.01)

(52) U.S. Cl.
CPC ............. A62C 3/07 (2013.01); A62C 3/16 (2013.01); A62C 31/28 (2013.01); B05B 15/70 (2018.02)

(58) Field of Classification Search
CPC .... A62C 3/07; A62C 3/08; A62C 3/10; A62C 3/16; A62C 31/28; A62C 35/023; A62C 35/11; A62C 35/13; A62C 37/04; A62C 37/36; A62C 37/38; A62C 37/40; A62C 37/44; A62C 37/46; A62C 37/48; B05B 15/70; H01M 50/249; H01M 50/271
See application file for complete search history.

(56) References Cited

U.S. PATENT DOCUMENTS

| 2011/0000801 | A1* | 1/2011 | Hirakawa | A62C 3/07 206/223 |
| 2018/0318618 | A1* | 11/2018 | Koreis | A62C 4/02 |
| 2020/0373525 | A1* | 11/2020 | Pfeiff | H01M 50/24 |
| 2021/0283437 | A1* | 9/2021 | Kang | H01M 50/249 |
| 2021/0387031 | A1* | 12/2021 | Yang | A62C 3/07 |
| 2022/0280823 | A1* | 9/2022 | Baeder | H01M 10/42 |

FOREIGN PATENT DOCUMENTS

| CN | 112950886 A * | 6/2021 | ............ A62C 31/12 |
| DE | 202021106777 U1 * | 3/2022 | ............... A62C 3/16 |
| FR | 2997231 A1 * | 4/2014 | ............... A62C 3/07 |

* cited by examiner

Primary Examiner — Darren W Gorman
(74) Attorney, Agent, or Firm — MCDONNELL BOEHNEN HULBERT & BERGHOFF LLP

(57) ABSTRACT

A fire extinguishing apparatus of a vehicle is capable of effectively extinguishing a fire by uniformly and directly spraying a fire extinguishing agent in a wide range to a battery cell covered with an external structure in a vehicle. The fire extinguishing apparatus includes a cover, a spray nozzle, a controller, a driving device, and a fire extinguishing agent supplying device.

15 Claims, 7 Drawing Sheets

FIRE EXTINGUISHING APPARATUS OF VEHICLE

CROSS REFERENCE TO RELATED APPLICATIONS

The present application claims priority to Korean Patent Application No. 10-2021-0096772, filed Jul. 23, 2021, the entire contents of which is incorporated herein for all purposes by this reference.

BACKGROUND

Field

The present disclosure relates to a fire extinguishing apparatus of a vehicle. More particularly, the present disclosure relates to a fire extinguishing apparatus of a vehicle, the fire extinguishing apparatus being capable of effectively extinguishing a fire by uniformly and directly spraying a fire extinguishing agent in a wide range to a battery cell covered with an external structure in a vehicle.

Description of the Related Art

Recently, due to global environmental regulations, environmentally-friendly vehicles have come into wider use. The environmentally-friendly vehicles include a hybrid electric vehicle (HEV), a battery electric vehicle (BEV), a fuel cell electric vehicle (FCEV), and so on.

A plug-in hybrid electric vehicle (PHEV) is known as the HEV, and the PHEV and the BEV are an electric vehicle that charges a battery by receiving electric power from an external source. In addition, these environmentally-friendly vehicles have a common configuration that a motor is provided as a driving device that drives the environmentally-friendly vehicle and a battery that supplies the electric power to the motor is provided.

When a fire occurs in the battery of the environmentally-friendly vehicle, the fire may spread in a short time due to the external structure of the battery and the material of the battery. Further, in a public transportation vehicle such as a bus, since many passengers are on board, rapid fire suppression for the purpose of passenger safety is essential, and a failure of initial suppression of a fire may lead to a catastrophic disaster.

Use of a fire extinguisher is widely known as a method for managing a fire at a vehicle. However, when a driver fails to use the fire extinguisher at a proper time, an initial extinguishing of a fire fails, thus causing the fire to spread the entire vehicle. Further, due to a material inside the battery, a fire that occurs on the battery is very difficult to extinguish by using only a small fire extinguisher or by only spraying a fire extinguishing agent.

In addition, since the driver is inside the vehicle while driving the vehicle, even though a fire occurs in the battery, it is difficult to recognize the occurrence of the fire until there is a large amount of smoke. Further, unlike a passenger car, since a bus has a large and long body, it is more difficult to recognize whether the fire occurs or not and where the fire has occurred.

Therefore, the driver may not rapidly execute extinguishing of the fire in the early of the occurrence of the fire, which may lead to a burning of the vehicle since the fire is spread, and a risk of casualties may increase. Even though the driver or the passenger rapidly recognizes the occurrence of the fire, it is difficult to rapidly extinguish the fire on the battery by using only the small fire extinguisher that is provided at the vehicle.

Moreover, depending on types of vehicles such as a large bus and so on, there is an external structure for protection, such as a casing that covers a battery cell in a battery pack that is mounted on the roof of the vehicle and so on. Therefore, even though the driver may recognize the occurrence of the fire at a proper time, it is difficult to spray the fire extinguishing agent to an inside of the external structure of the battery. Further, even though the fire extinguishing agent is sprayed, an effective extinguishing of the fire may not be realized since the fire extinguishing agent does not properly reach to the battery cell in the external structure.

Moreover, even though it is possible to enable the fire extinguishing agent to be sprayed adjacent to the battery cell by installing a spray nozzle inside the external structure, the fire extinguishing agent is sprayed only in a narrow range from the spray nozzle installed inside the external structure by considering a layout inside the external structure and a narrow space. Therefore, the effective extinguishing of the fire is difficult since it is unable to spray the fire extinguishing agent in a wide range with the spray nozzle installed inside the external structure.

Recently, as a use of the environmentally-friendly vehicle increases, a risk of the occurrence of the fire increases due to external shock or internal short circuit in the battery or surrounding high-voltage electric wiring. However, there is still no effective method of extinguishing a fire that has occurred on the battery, so that there is a risk of burning of the vehicle and occurrence of casualties.

SUMMARY

Accordingly, the present disclosure has been made keeping in mind the above problems occurring in the related art, and the present disclosure is intended to propose a fire extinguishing apparatus of a vehicle, the fire extinguishing apparatus being capable of effectively extinguishing a fire by uniformly and directly spraying a fire extinguishing agent in a wide range to a battery cell covered with an external structure in a vehicle.

The objectives of the present disclosure are not limited to the aforementioned description, and other objectives not explicitly disclosed herein will be clearly understood by those skilled in the art to which the present disclosure pertains from the description provided hereinafter.

In order to achieve the above objective, according to an embodiment of the present disclosure, there is provided a fire extinguishing apparatus of a vehicle, the fire extinguishing apparatus including a cover mounted on a battery casing surrounding a battery cell at a battery pack of a vehicle, and configured to open and close the battery casing, a spray nozzle configured to be moved to a position of spraying a fire extinguishing agent, the position being capable of enabling the fire extinguishing agent to be sprayed inside the battery casing on which the cover is in an opened state; a fire detection sensor configured to detect an occurrence of a fire inside the battery casing, a controller configured to generate and output a control signal for extinguishing the fire when a fire is detected by the fire detection sensor, a driving device configured to open the cover in response to the control signal output from the controller, and to be operated such that the spray nozzle is moved to the position of spraying the fire extinguishing agent, and a fire extinguishing agent supplying device configured to be operated such that the fire extinguishing agent is supplied to the spray nozzle in response to the control signal output from the controller.

In addition, the fire extinguishing apparatus may further include a warning device configured to warn of the occurrence of the fire in response to the control signal output from the controller.

In addition, the cover may be hinge-fastened to the battery casing via a hinge shaft such that the cover is rotated during opening thereof with respect to the battery casing, the hinge shaft may be integrally fixed to and coupled to the cover, and the driving device may be configured to rotate the hinge shaft to open the cover.

In addition, the spray nozzle may be coupled to the hinge shaft such that the spray nozzle is moved to the position of spraying the fire extinguishing agent by the hinge shaft that is rotated when the driving device is operated.

Here, the spray nozzle may be rotated in a raised position of spraying the fire extinguishing agent when the hinge shaft is rotated in a state in which a lower end thereof is integrally fixed to and coupled to the hinge shaft.

In addition, the spray nozzle may be configured to be rotated integrally with the hinge shaft until the spray nozzle reaches to the position of spraying the fire extinguishing agent in which the spray nozzle is inclined with respect to the lower end portion thereof, and a plurality of nozzle holes configured to spray the fire extinguishing agent at regular intervals along a longitudinal direction of the spray nozzle may be formed so as to uniformly spray the fire extinguishing agent inside the battery casing on which the cover is in the opened state.

In addition, the driving device may include a motor configured to rotate the hinge shaft by operating in response to the control signal output from the controller.

Here, the cover may include a first cover and a second cover that are hinge-fastened to opposite sides of the battery casing via the hinge shafts, and the driving device may include a motor configured to rotate the hinge shaft coupled to the first cover and a motor configured to rotate the hinge shaft coupled to the second cover.

In addition, the driving device may include a hydraulic pressure pump configured to supply hydraulic pressure by being operated in response to the control signal output from the controller, a cooperation device configured to be operated such that the hinge shaft is rotated by the hydraulic pressure supplied from the hydraulic pressure pump, and a hydraulic pressure hose connected to the cooperation device so as to supply the hydraulic pressure from the hydraulic pressure pump to the cooperation device.

Here, the cooperation device may include a rack housing connected to the hydraulic pressure pump through the hydraulic pressure hose such that the hydraulic pressure is supplied inside the rack housing through the hydraulic pressure hose when the hydraulic pressure pump is driven, a rack bar provided inside the rack housing so as to be rectilinearly movable therein by the hydraulic pressure supplied inside the rack housing, and a pinion fixed to and mounted on an end portion of the hinge shaft inserted inside the rack housing, the pinion being engaged with the rack bar and configured to integrally rotate the hinge shaft by being rotated when the rack bar is rectilinearly moved.

In addition, a fire extinguishing agent supplying hose may be connected to a plurality of spray nozzles of each of the battery packs from the fire extinguishing agent supplying device so as to deliver the fire extinguishing agent from the fire extinguishing agent supplying device to the plurality of spray nozzles provided at the battery packs.

In addition, the cover may include a first cover and a second cover that are hinge-fastened to opposite sides of each of the battery casings of the plurality of battery packs via the respective hinge shafts, a first hinge shaft fixed to and coupled to the first cover and a second hinge shaft fixed to and coupled to the second cover protrude outwardly from the plurality of battery packs in directions opposite to each other with respect to the battery casing, and the pinion may include pinions that are fixed to and mounted on the end portions of the extended hinge shafts, respectively.

Here, the rack housing may include a first rack housing connected to the hydraulic pressure pump through a first hydraulic pressure hose and a second rack housing connected to the first rack housing through a second hydraulic pressure house, and the rack bar may include a first rack bar provided inside the first rack housing so as to be rectilinearly movable therein by the hydraulic pressure supplied inside the first rack housing through the first hydraulic pressure hose and a second rack bar provided inside the second rack housing so as to be rectilinearly movable therein by the hydraulic pressure supplied inside the second rack housing through the second hydraulic pressure hose.

In addition, the pinion fixed to and mounted on the first hinge shaft at the plurality of battery packs may be engaged with the first rack bar, and the pinion fixed to and mounted on the second hinge shaft at the plurality of battery packs may be engaged with the second rack bar.

In addition, an opening and closing valve may be installed on each of the fire extinguishing agent supplying hoses connected to the spray nozzles, and the controller may be configured to control an opening and closing operation of each of the opening and closing valves so as to allow the fire extinguishing agent to be selectively supplied to the spray nozzle installed on the battery pack on which the occurrence of a fire is detected by the fire detection sensor.

Hereby, according to the fire extinguishing apparatus of a vehicle of the present disclosure, since the fire extinguishing agent is directly sprayed inside the battery pack, the fire extinguishing performance may increase, and since the fire extinguishing agent is sprayed while the spray nozzle is in a state of being rotated upward, the fire extinguishing agent may be sprayed in a wider range compared to a situation that the spray nozzle is installed inside the battery pack.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Figure 1:
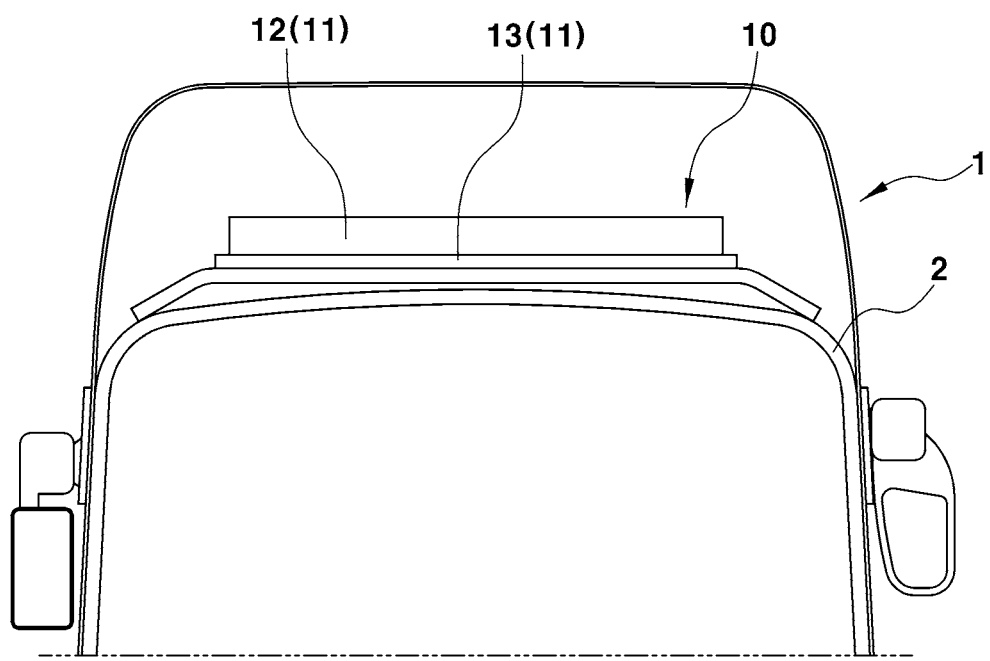
FIG. 1 is a schematic view illustrating a state in which a battery pack is mounted on a roof of an electric bus to which a fire extinguishing apparatus according to the present disclosure may be applied.

As description on a specific structure or a function provided in embodiments of the present disclosure is to describe only the embodiments according to a concept of the present disclosure, the embodiments according to the concept of the present disclosure may be implemented in various modifications. In addition, it is to be understood that the present disclosure is not limited to the disclosed embodiments, but is intended to cover all modifications and equivalents or substitutes included within the spirit and technical scope of the present disclosure.

Meanwhile, though terms such as "the first" and/or "the second" used in the present disclosure may be used to explain various constituents, the constituents are not limited to such terms. The terms can be used for a purpose to distinguish one constituent from another constituent, for example, within a scope not deviating from a protection scope according to the concept of the present disclosure, and the first constituent may be named as the second constituent or the second constituent may be named as the first constituent.

When a constituent is referred to as being "connected" or "joined" to another constituent, this should be understood that the constituent may be directly connected or joined to the other constituent, but a different constituent may be interposed therebetween. In contrast, when a constituent is referred to as being "directly connected" or "directly joined" to another constituent, this should be understood that no different constituent is interposed therebetween. Other expressions to explain relationship between other constituents such as "between" and "just between" or "adjacent to" and "directly adjacent to" should be understood in the same way.

In addition, the same constituents are denoted by the same reference numerals throughout the specification. Terms used in the present specification are used to describe only specific embodiment and are not intended to limit the present disclosure. An expression in a singular form includes an expression in a plural form, unless the meaning is not obviously different contextually. It should be understood that terms such as "comprise" and/or "comprising" in the present disclosure are intended to designate the existence of a character, a numeral, a step, a movement, a constituent, a parts, or a combination of these which are embodied, and not to exclude at least one of other character, numeral, step, movement, constituent, parts, or combination of these, or an additional possibility.

Hereinafter, embodiments of the present disclosure will be described in detail with reference to attached drawings.

The present disclosure is intended to provide a fire extinguishing apparatus of a vehicle, in which the fire extinguishing apparatus is capable of effectively extinguishing a fire by uniformly and directly spraying a fire extinguishing agent in a wide range to a battery cell inside an external structure after a fire that has occurred on the battery cell that is covered with the external structure in a vehicle is detected.

The fire extinguishing apparatus according to the present disclosure may be applicable to an environmentally-friendly vehicle on which a single or multiple battery packs are mounted. For example, the fire extinguishing apparatus according to the present disclosure may be usefully applied to an electric bus having multiple battery packs mounted on a roof thereof.

In addition to the electric bus, the fire extinguishing apparatus according to the present disclosure may be applicable to a commercial fuel cell vehicle, and for example, the fire extinguishing apparatus according to the present disclosure may be applicable to the environmentally-friendly vehicle such as a hydrogen-electric truck on which a single or multiple batteries are mounted. The above described is an example, and the fire extinguishing apparatus according to the present disclosure is applicable to a vehicle on which a battery is required to be mounted, and is not particularly limited.

FIG. 1 is a schematic view illustrating a state in which a battery pack is mounted on a roof of an electric bus, and exemplifies a state in which a battery pack 10 is mounted on an upper side of a roof 2 of an electric bus 1. A single battery pack is illustrated in FIG. 1, however, it should be understood that the battery pack may be mounted on each of the left side and the right side of a vehicle, or a plurality of battery packs may be mounted and arranged on the upper side of the roof 2 along a longitudinal direction of the electric bus 1.

Figure 2:
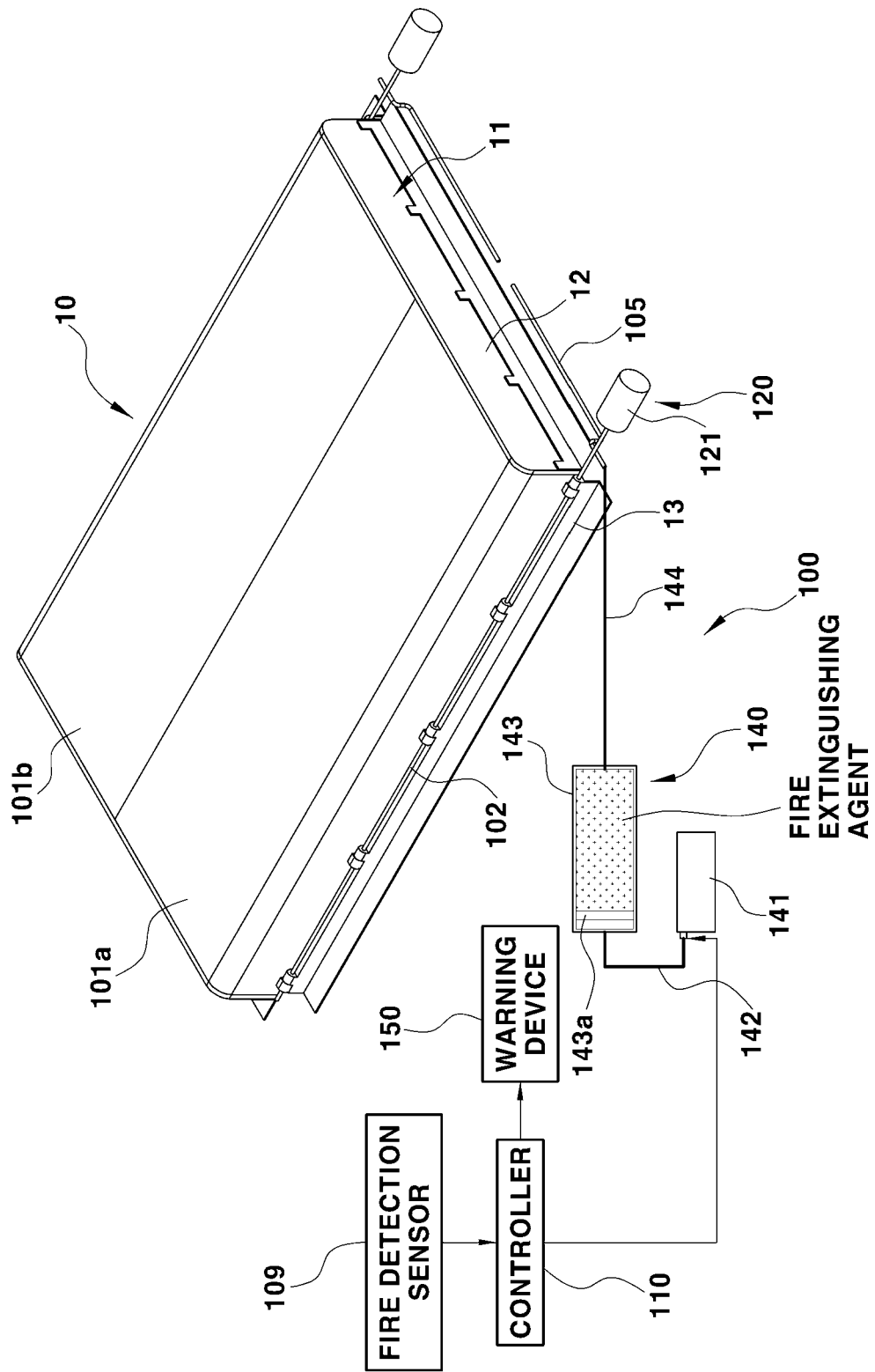
FIG. 2 is a perspective view illustrating a configuration of the fire extinguishing apparatus according to an embodiment of the present disclosure.
Figure 3:
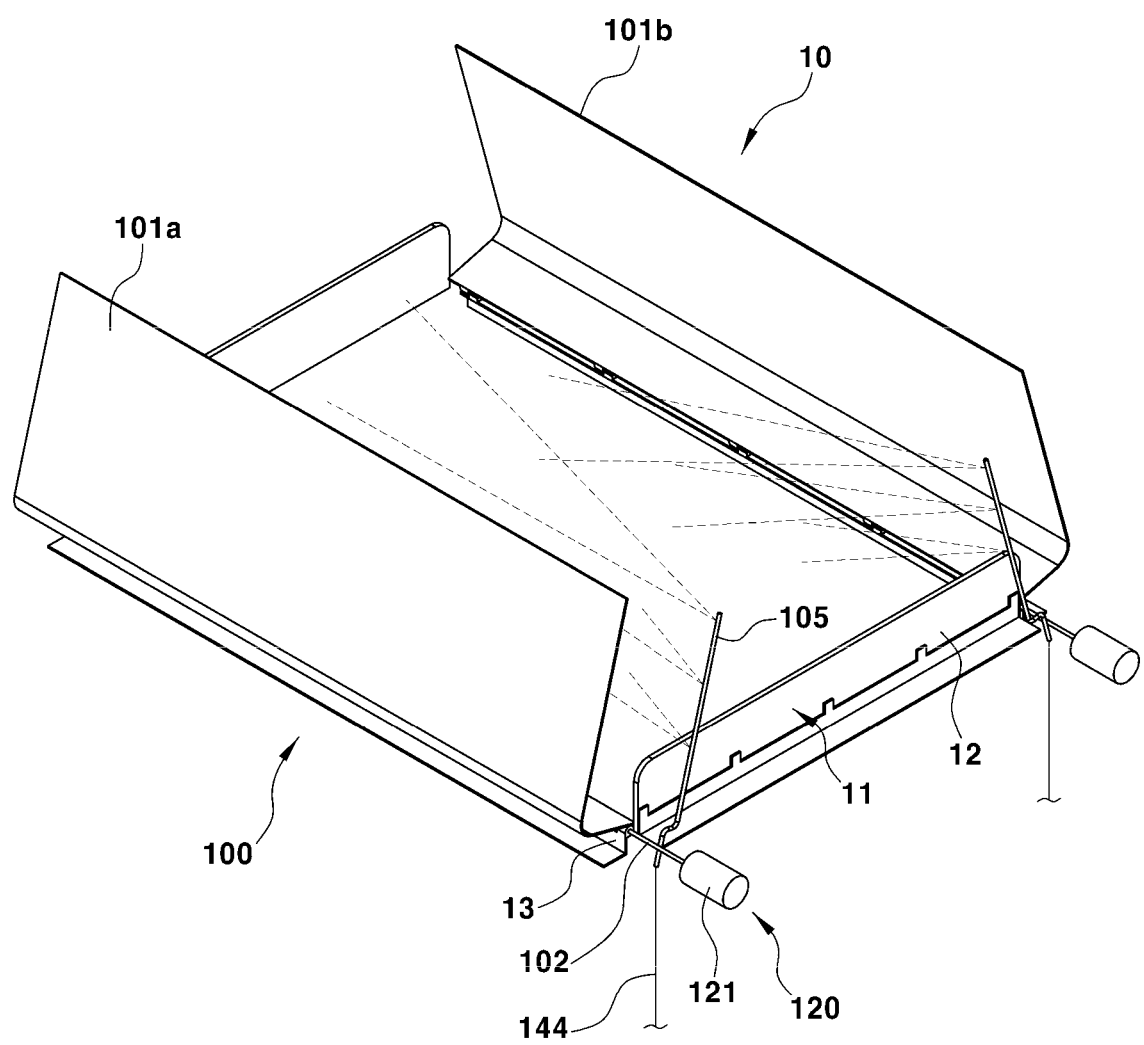
FIG. 3 is a perspective view illustrating a state in which a fire extinguishing agent is being sprayed after a cover of the fire extinguishing apparatus according to an embodiment of the present disclosure is opened.

FIG. 2 is a perspective view illustrating a configuration of the fire extinguishing apparatus according to an embodiment of the present disclosure, and FIG. 3 is a perspective view illustrating a state in which a fire extinguishing agent is being sprayed after a cover of the fire extinguishing apparatus according to an embodiment of the present disclosure is opened. In FIGS. 2 and 3, the fire extinguishing apparatus 100 capable of extinguishing a fire by supplying and spraying the fire extinguishing agent by targeting the single battery pack 10 is exemplified.

In the present disclosure, the battery pack 10 includes a battery casing 11, and a battery module (not illustrated) arranged and accommodated inside the battery casing 11. Further, the battery module is formed of a plurality of unit cells that are battery cells (not illustrated). The battery module and the battery cells that configure the battery module that are illustrated in the attached drawings are accommodated inside the battery casing 11, so that the battery module and the battery cells are not illustrated.

The battery pack 10 includes a mounting portion 13 integrally provided at a lower portion of the battery casing 11, and the battery pack 10 is fixed to and mounted on a vehicle by the mounting portion 13 being fixed to the upper side of the roof 2 of the vehicle by bolting or the like.

The fire extinguishing apparatus 100 according to the present disclosure is configured to extinguish a fire that has occurred inside the battery pack 10. More particularly, the fire extinguishing apparatus 100 according to the present disclosure is configured to extinguish the fire that has occurred on the battery cells and the battery module that are surrounded by the battery casing 11.

Conventionally, when a fire has occurred on a battery pack, a situation in which the fire is spread in a very short time inside a battery casing in which battery cells are accommodated has occurred. Moreover, when a fire extinguishing apparatus is mounted on an external portion of the battery pack, there has been a problem in that the fire is not extinguished since the fire extinguishing agent cannot reach the battery cells positioned inside the battery pack although the fire extinguishing apparatus is operated.

Therefore, in the present disclosure, covers 101a and 101b installed on the battery casing 11 are configured to be opened before the fire is spread so as to extinguish the fire that has occurred inside the battery pack 10, thereby enabling the fire extinguishing agent to be directly sprayed to the battery module and the battery cells that are positioned inside the battery casing. Therefore, a spread of the fire is effectively restrained and extinguished simultaneously.

To this end, the fire extinguishing apparatus 100 according to an embodiment of the present disclosure may include the covers 101a and 101b mounted on the battery casing 11 and configured to open a first side of the battery casing 11, a spray nozzle 105 configured to be moved together with each of the covers 101a and 101b to a position of spraying the fire extinguishing agent when the covers 101a and 101b configured to open the first side of the battery casing 11 are operated, a driving device 120 configured to operate the covers 101a and 101b to open, and the driving device 120 being configured to move the spray nozzle 105 to a predetermined position of spraying the fire extinguishing agent, a fire extinguishing agent supplying device 140 configured to supply the fire extinguishing agent to the spray nozzle 105, and a controller 110 configured to control an operation of both the driving device 120 and the fire extinguishing agent supplying device 140.

In addition, the fire extinguishing apparatus 100 according to an embodiment of the present disclosure may further include a fire detection sensor 109 configured to detect an occurrence of a fire inside the battery pack 10, and the fire detection sensor 109 may be installed inside the battery casing 11. The fire detection sensor 109 according to an embodiment of the present disclosure may be a gas detection sensor configured to detect gas generated at the battery cells when the fire occurs, and for example, the gas detection sensor may be a carbon monoxide (CO) detection sensor configured to detect a concentration of CO.

The fire detection sensor 109 is connected to the controller 110 and configured to input a signal in accordance with a detection of the fire. Therefore, by the signal from the fire detection sensor 109, the controller 110 is capable of recognizing the occurrence of the fire inside the battery pack 10. For example, when the concentration of gas detected by the fire detection sensor 109 is equal to or more than a predetermined value, the controller 110 may determine that a fire occurs inside the battery pack 10.

Otherwise, the fire detection sensor 109 may be a temperature sensor installed inside the battery casing 11. Further, when a temperature inside the battery pack 10 detected by a signal from the temperature sensor is equal to or more than a predetermined temperature, the controller 110 may determine that a fire is occurring inside the battery pack 10. Here, the inside of the battery pack 10 means an inside space of the battery casing 11 in which the battery cells are accommodated.

In addition, the fire extinguishing apparatus 100 according to an embodiment of the present disclosure may further include a warning device 150 configured to warn of the occurrence of the fire in response to a control signal output from the controller 110 when the controller 110 receives the signal from the fire detection sensor 109 and determines that the fire is occurring. Here, the warning device 150 may be a sound output device provided to output a warning sound notifying that the fire has occurred in the vehicle, or the warning device 150 may be a display device of the vehicle configured to allow a warning message notifying that the fire has occurred to be popped-up and displayed. The sound output device includes a speaker mounted in the vehicle, and the display device may be a display device of a cluster.

In the battery pack 10, the covers 101a and 101b are hinge-fastened to the first side of the battery casing 11, and the battery casing 11 may include a lower surface portion, two side surface fixing portions 12, and the mounting portion 13 integrally provided at the lower surface portion. As described above, since the mounting portion 13 of the battery casing 11 is fixed to the roof 2, the entire portion of the batter pack 10 may maintain a fixed and mounted state.

In addition, when the covers 101a and 101b are in the closed state, the covers 101a and 101b, the lower surface portion of the battery casing 11, and the two side surface fixing portions 12 form a rectangular shape. Further, in the closed state, the inside space of the battery casing 11 is sealed. As illustrated in drawings, the covers 101a and 101b may be provided such that the upper surface of the battery casing 11 is opened or closed.

The covers 101a and 101b may be configured as a first cover 101a and a second cover 101b that are respectively installed on opposite sides of the battery casing 11 and capable of being opened and closed. When the first cover 101a and the second cover 101b are in the closed state, the first cover 101a and the second cover 101b may be provided such that a part of the side surface portions and a part of the upper surface portion are formed in a rectangular shape. That is, when the first cover 101a and the second cover 101b are in the closed state, a part of the first cover 101a and a part of the second cover 101b form the upper surface portion of the rectangular shape, and the other part of the first cover 101a and the other part of the second cover 101b form the two side surfaces portion of the rectangular shape.

According to an embodiment of the present disclosure, a lower end portion of the first cover 101a and a lower end portion of the second cover 101b may be hinge-fastened to the lower surface portion of the battery casing 11 or the mounting portion 13 via respective hinge shafts 102. At this time, two hinge shafts 102 that respectively hinge-fastens both the first cover 101a and the second cover 101b to the battery casing 11 (the lower surface portion or the mounting portion 13) are connected to the driving device 120.

According to an embodiment of the present disclosure, the driving device 120 may include a motor 121 having a rotary shaft integrally coupled to an end portion of the hinge shaft 102 of each of the covers 101a and 101b. In order to open and close both the first cover 101a and the second cover 101b, a single motor 121 may be mounted and used for each of the covers 101a and 101b. That is, two motors 121 are provided and used, and the single hinge shaft 102 is integrally coupled to the rotary shaft of each of the motors 121. Therefore, when the motor 121 is driven so that the rotary shaft is rotated, the hinge shaft 102 is capable of being integrally rotated. Each of the motors 121 is fixed to and mounted on a vehicle body structure outside the battery pack 10 (the roof or the like) via a mounting structure such as a mounting bracket or the like.

According to an embodiment of the present disclosure, each of the hinge shafts 102 may be directly coupled to the rotary shaft of the respective motors 121, as illustrated in drawings, or a gear device having a predetermined gear ratio may be interposed between the rotary shaft of the motor 121 and the hinge shaft 102. The gear device may include a plurality of gears mutually engaged therewith, and a rotating force of the motor 121 is decelerated and transferred to the corresponding hinge shaft 102 by the gear device.

In addition, the spray nozzle 105 may have a nozzle hole that allows the fire extinguishing agent to be sprayed is formed on a long pipe, and a plurality of nozzle holes are arranged in predetermined intervals along a longitudinal direction of the spray nozzle 105. In addition, a first end portion of the spray nozzle 105 is integrally coupled to the hinge shaft 102, and a fire extinguishing agent supplying hose 144 of the fire extinguishing agent supplying device 140 is connected to the first end portion of the spray nozzle 105.

The spray nozzles 105 may be mounted on the respective hinge shafts 102. Further, when the covers 101*a* and 101*b* are operated and opened due to the rotation of the corresponding hinge shafts 102 by the operation of the driving device 120, each of the spray nozzles 105 is rotated with respect to the corresponding hinge shafts 102. At this time, each of the spray nozzles 105 is rotated in a direction rising upward with respect to the first end portion of each of the spray nozzles 105 and each of the hinge shafts 102.

Consequently, as illustrated in FIG. 3, when the fire extinguishing agent is supplied to each of the spray nozzles 105 through the fire extinguishing agent supplying hose 144 of the fire extinguishing agent supplying device 140, the fire extinguishing agent may be sprayed into the inside space of the battery casing 11 in a wide range and angle from the spray nozzle 105 in a standing state. Therefore, the fire extinguishing agent is uniformly sprayed to the battery cells inside the battery casing 11 to effectively extinguish a fire.

In addition, referring again to FIG. 2, in an embodiment of the present disclosure, the fire extinguishing agent supplying device 140 is provided so that the fire extinguishing agent is to be selectively supplied in response to the control signal output from the controller 110, and the fire extinguishing agent supplying device 140 may include a nitrogen tank 141 filled with a high pressure nitrogen, a fire extinguishing agent tank 143 having a piston 143*a* mounted inside thereof and having the inside thereof filled with the fire extinguishing agent, a nitrogen supplying hose 142 connecting the nitrogen tank 141 to the fire extinguishing agent tank 143, and a fire extinguishing agent supplying hose 144 connected to each of the spray nozzles 105 from an outlet of the fire extinguishing agent tank 143.

In the fire extinguishing agent supplying device 140, an outlet of the nitrogen tank 141 is opened in response to the control signal output from the controller 110, and then the high pressure nitrogen filled in the nitrogen tank 141 is passing through the nitrogen supplying hose 142 and is supplied inside the fire extinguishing agent tank 143 filled with the fire extinguishing agent. At this time, pressure of the high pressure nitrogen transferred to an inside of the fire extinguishing agent tank 143 acts on the piston 143*a*, and the piston 143*a* in the fire extinguishing agent tank 143 is operated by the pressure. Consequently, the fire extinguishing agent in the fire extinguishing agent tank 143 is pressurized by a pushing force of the piston 143*a* so that the fire extinguishing agent is supplied to the fire extinguishing agent supplying hose 144 at a high pressure, so that the fire extinguishing agent is supplied to the spray nozzle 105 through the fire extinguishing agent supplying hose 144.

An embodiment illustrated in FIGS. 2 and 3 has a configuration of the fire extinguishing apparatus 100 targeting one battery pack 10, and the fire extinguishing apparatus 100 targeting the single battery pack 10 is exemplified. However, the configuration that is illustrated may be applied to a plurality of the battery packs 10. That is, a part of the individual fire extinguishing apparatus 100 may be installed on each of the battery packs 10. Of course, in this case, each fire extinguishing agent supply line in which the fire extinguishing agent is supplied from the fire extinguishing agent tank 143 has to be divergently connected to each of the spray nozzles 105.

Figure 4:
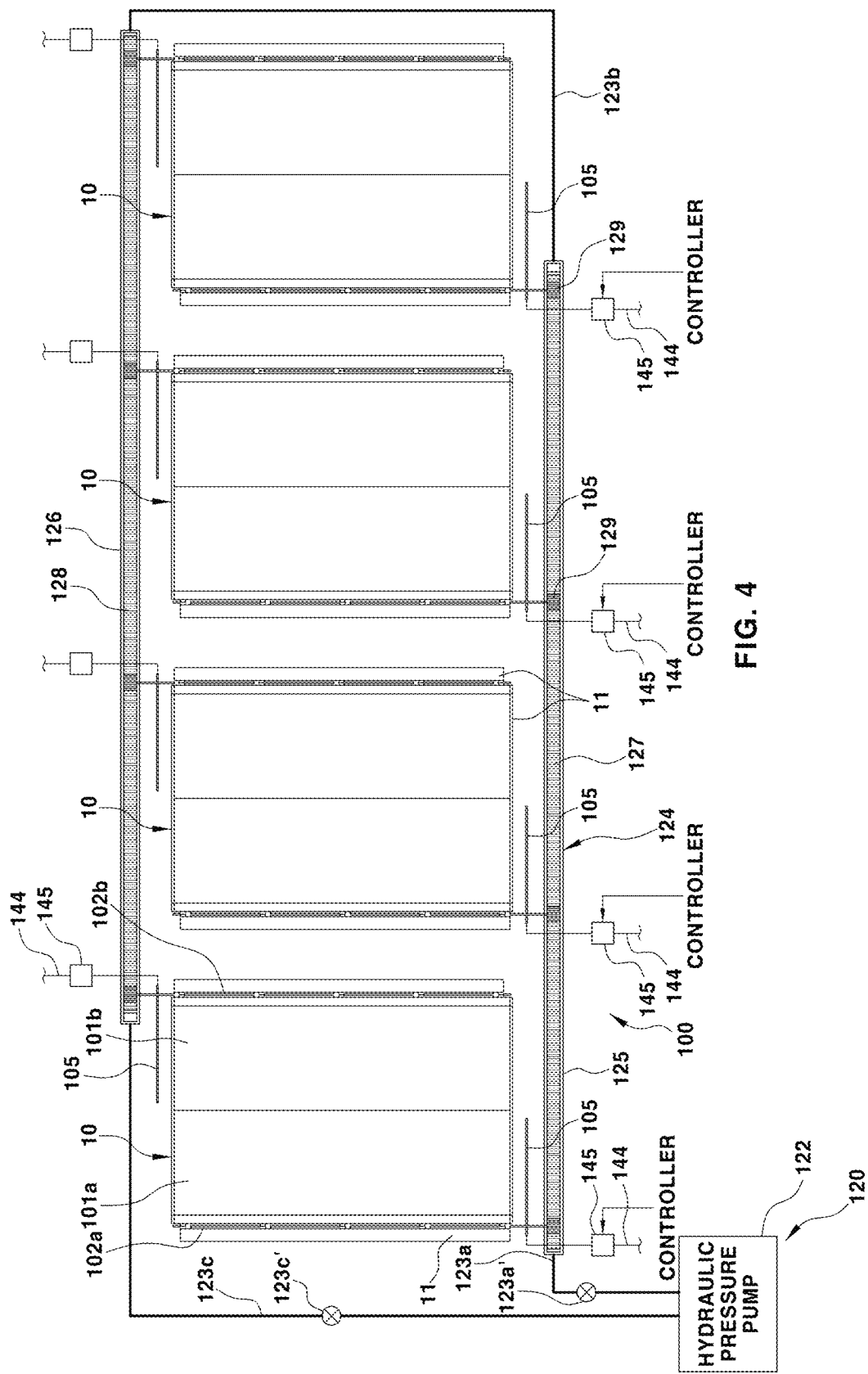
FIG. 4 is a plan view illustrating a configuration of the fire extinguishing apparatus according to another embodiment of the present disclosure.
Figure 5:
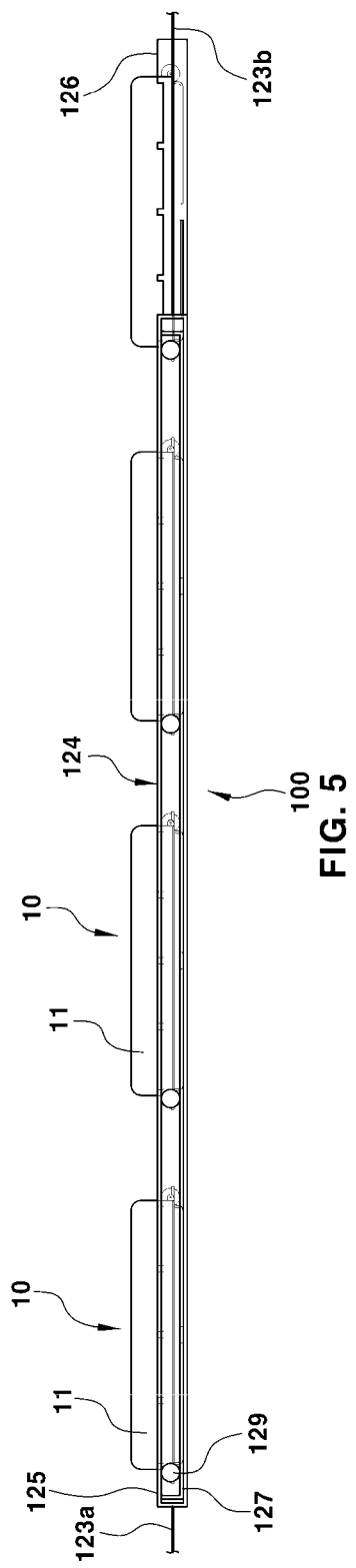
FIG. 5 is a view illustrating a closed state of the covers of the fire extinguishing apparatus according to another embodiment of the present disclosure.
Figure 6:
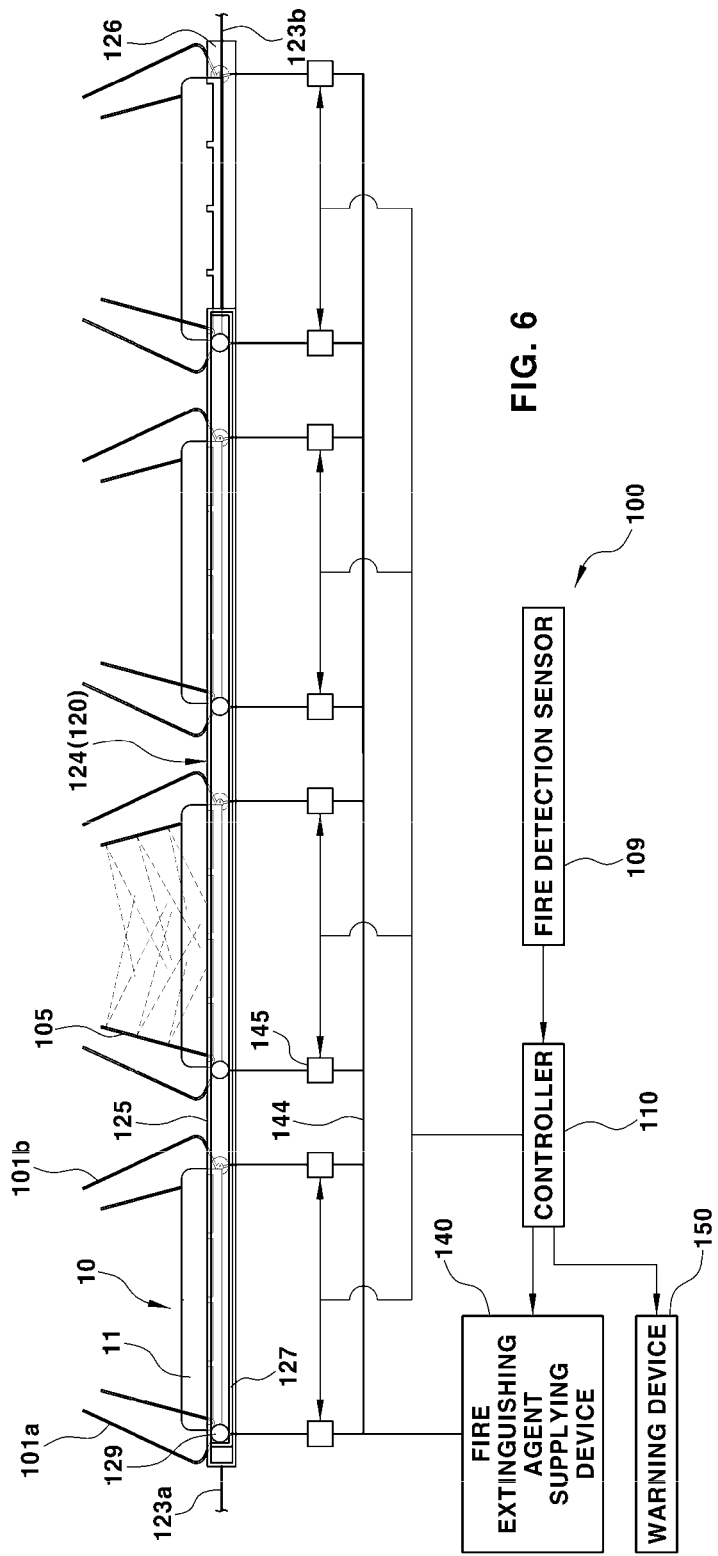
FIG. 6 is a view illustrating an opened state of the covers of the fire extinguishing apparatus according to another embodiment of the present disclosure.

FIG. 4 is a plan view illustrating a configuration of the fire extinguishing apparatus according to another embodiment of the present disclosure, FIG. 5 is a view illustrating a closed state of the covers of the fire extinguishing apparatus according to another embodiment of the present disclosure, and FIG. 6 is a view illustrating an opened state of the covers of the fire extinguishing apparatus according to another embodiment of the present disclosure.

The embodiment illustrated in FIGS. 4 to 6 has a configuration in which each of the covers 101*a* and 101*b* of a plurality of battery packs 10 is operated and opened by using the single driving device 120 and the spray nozzle 105 of the battery packs 10 is moved (rotated) to a position of spraying the fire extinguishing agent. However, an opening and closing valve 145 is installed on the fire extinguishing agent supplying hose 144 that is connected to the spray nozzle 105 of each of the battery packs 10.

The fire extinguishing agent supplying hose 144 that is connected to the fire extinguishing agent tank 143 of the fire extinguishing agent supplying device 140 is diverged from the middle thereof, and is connected to the spray nozzle 105 of each of the battery packs 10. Further, the opening and closing valve 145 is installed on each of the diverged fire extinguishing agent supplying hoses 144. The opening and closing valve 145 is an electronic valve having an opening and closing operation controlled in response to the control signal of the controller 110, and regulates a supply of the fire extinguishing agent to the corresponding spray nozzle 105 in accordance with opening/closing states thereof.

That is, when in a state in which the opening and closing valve 145 is installed on each of the fire extinguishing agent supplying hoses 144 diverged to the plurality of battery packs 10, and when the opening and closing valve 145 selected among the entire opening and closing valves 145 is opened in response to the control signal output from the controller 110, the fire extinguishing agent supplied from the fire extinguishing agent supplying device 140 that supplies the fire extinguishing agent only through the fire extinguishing agent supplying hose 144 on which the opening and closing valve 145 is opened may be supplied to the spray nozzle 105.

As such, the opening and closing valve 145 is for enabling the fire extinguishing agent to be selectively supplied to the spray nozzle 105 of each of the battery packs 10. In more detail, when it is determined that a fire has occurred on a specific battery pack 10 among the entire battery packs 10, the controller 110 outputs the control signal for extinguishing the fire that has occurred on the specific battery pack 10. In addition, the driving device 120 is operated in response to the control signal so that all the covers 101*a* and 101*b* of the entire battery packs 10 are opened, and the spray nozzle 105 of the entire battery packs 10 are moved (rotated) to a position of spraying the fire extinguishing agent at the same time.

At this time, only the opening and closing valve 145 of the battery pack 10 in which the fire has occurred is selectively opened, and the fire extinguishing agent is selectively supplied to the spray nozzle 105 of the battery pack 10 on which the opening and closing valve 145 is opened. Consequently, the fire may be extinguished by spraying the fire extinguishing agent through the spray nozzle 105 to only inside the battery pack 10 in which the fire has occurred.

Referring to FIG. 4 to explain the driving device 120 of another embodiment, the driving device 120 includes a hydraulic pressure pump 122 as a power source that provides power. In addition, the driving device 120 further includes a cooperation device 124 configured to simultaneously operate the hinge shafts 102*a* and 102*b* to be rotated by hydraulic pressure that is provided when the hydraulic pressure pump 122 is operated, in which the hinge shafts 102*a* and 102*b* are hinge-coupled between the battery casing 11 of the battery pack 10 and the covers 101*a* and 101*b*.

The cooperation device 124 is operated by the hydraulic pressure that the hydraulic pressure pump 122 provides so that the covers 101*a* and 101*b* of the entire battery packs 10 are simultaneously operated and opened, and the cooperation device 124 simultaneously moves the spray nozzles 105 of the entire battery packs 10 to the position of spraying the fire extinguishing agent. To this end, the cooperation device 124 is operated by the hydraulic pressure and is provided such that the hinge shafts 102*a* and 102*b* of the covers 101*a* and 101*b* are simultaneously rotated.

In the embodiment of the present disclosure, the cooperation device 124 includes rack housings 125 and 126 connected through a hydraulic pressure hose 123*a* from the hydraulic pressure pump 122 and provided to allow the hydraulic pressure to be supplied inside thereof through the hydraulic pressure hose 123*a* when the hydraulic pressure pump 122 is driven, rack bars 127 and 128 provided inside the respective rack housings 125 and 126 so as to be rectilinearly movable and configured to be rectilinearly moved by the hydraulic pressure supplied inside the rack housings 125 and 126, and pinions 129 engaged with the rack bars 127 and 128 and integrally mounted on the hinge shafts 102*a* and 102*b* of the covers 101*a* and 101*b*.

In the embodiment shown in FIGS. 2-4, the hinge shafts 102*a* and 102*b* of the covers 101*a* and 101*b* are shafts that allow the first cover 101*a* and the second cover 101*b* to be hinge-fastened to the battery casing 11, and a first end portion among opposite end portions of each of the hinge shafts 102*a* and 102*b* protrudes outwardly and is configured to be inserted inside the rack housings 125 and 126 by penetrating side surface portions of the rack housings 125 and 126.

In addition, the pinion 129 is integrally fixed and mounted on the first end portion of each of the hinge shafts 102*a* and 102*b* inserted inside the rack housings 125 and 126 by penetrating the side surface portions of the rack housings 125 and 126. The pinions 129 mounted on the first end portion of the hinge shafts 102*a* and 102*b* are engaged with the rack bars 127 and 128 inside the rack housings 125 and 126.

In addition, the first cover 101*a* and the second cover 101*b* of the battery packs 10 have to be opened simultaneously, and the first hinge shaft 102*a* having the first cover 101*a* integrally coupled therewith and the second hinge shaft 102*b* having the second cover 101*b* integrally coupled therewith have to be rotated opposite each other. Therefore, the rack housings 125 and 126 and the rack bars 127 and 128 include a first rack housing 125 and a first rack bar 127 configured to rotate the first hinge shaft 102*a* by the hydraulic pressure supplied through the hydraulic pressure hose 123*a* when the hydraulic pressure pump 122 is operated so as to open the covers of the battery packs 10, the hinge shaft 102*a* having the first cover 101*a* coupled to the hinge shaft 102*a*, and a second rack housing 126 and a second rack bar 128 configured to rotate the second hinge shaft 102*b* in directions opposite to that of the first hinge shaft 102*a*, the second hinge shaft 102*b* having the second cover 101*b* coupled to the second hinge shaft 102*b*.

A first hydraulic pressure hose 123*a* is connected between a discharge port of the hydraulic pressure pump 122 and an inlet of the first rack housing 125, a second hydraulic pressure hose 123*b* is connected between an outlet of an outlet of the first rack housing 125 and an inlet of the second rack housing 126, and a third hydraulic pressure hose 123*c* is connected between an outlet of the second rack housing 126 and a suction port of the hydraulic pressure pump 122.

Working oil is filled in the first hydraulic pressure hose 123*a*, the second hydraulic pressure hose 123*b*, and the third hydraulic pressure hose 123*c*. Further, although not illustrated in drawings, an oil tank in which the working oil is stored may be installed at the third hydraulic pressure hose 123*c*. In addition, a valve 123*a*' and 123*c*' that an opening and closing operation is controlled in response to the control signal of the controller 110 may be installed at least a part among the hydraulic pressure hoses 123*a*, 123*b*, and 123*c*.

In addition, a position at which the pinion 129 is installed at the first hinge shaft 102*a* of the entire battery packs 10 is an end portion in the same direction, and a position at which the pinion 129 is installed at the second hinge shaft 102*b* of the entire battery packs 10 is an end portion in the same direction. An end portion on which the pinion 129 is mounted at the first hinge shaft 102*a* and an end portion on which the pinion 129 is mounted at the second hinge shaft 102*b* are end portions positioned opposite to each other with respect to the battery pack 10.

That is, the entire first hinge shafts 102*a* protrude outwardly in the same direction (downward in the drawings) from the battery casing 11 by positioning each of the battery packs 10 therebetween, and the entire second hinge shafts 102*b* also protrude outwardly in the same direction (upward in the drawings) from the battery casing 11. Further, in the battery pack 10, the first hinge shaft 102*a* and the second hinge shaft 102*b* protrude outwardly opposite to each other, and the pinions 129 are integrally mounted on the end portions of the extended hinge shafts 102*a* and 102*b*, respectively.

In addition, the first rack housing 125 and the second rack housing 126 are arranged at a position opposite to each other by positioning the battery pack 10 therebetween, and the pinion 129 mounted on the end portion of the first hinge shaft 102 inside the first rack housing 125 is engaged with the first rack bar 127. In addition, the pinion 129 mounted on the end portion of the second hinge shaft 102*b* inside the second rack housing 126 is engaged with the second rack bar 128.

The first rack housing 125 and the second rack housing 126 function as a cylinder in which the hydraulic pressure is supplied, and the rack bars 127 and 128 respectively mounted so as to slidably movable in a front-rear direction inside the rack housings 125 and 126 function as pistons that are rectilinearly moved along a lengthwise direction of the corresponding rack housings 125 and 126. To this end, between the inlet and the outlet of the hydraulic pressure hose and the rack housings 125 and 126 are connected to be sealed to prevent oil from leaking.

Consequently, according to the driving device 120 having the configuration described above, when the hydraulic pressure pump 122 is operated in response to the control signal output from the controller 110 that detects a fire, the hydraulic pressure is supplied to an inside space of the inlet side of the first rack housing 125 through the first hydraulic pressure hose 123*a* from the hydraulic pressure pump 122, and the first rack bar 127 is moved frontward inside the first rack housing 125 by the hydraulic pressure supplied at this time.

As such, since the first rack bar 127 is moved frontward, working oil filled in an inside space of the outlet side of the first rack housing 125 is compressed and the hydraulic pressure is transferred to an inside space of an inlet side of the second rack housing 126 through the second hydraulic pressure hose 123*b* from the first rack housing 125. By the hydraulic pressure transferred at this time, the second rack bar 128 is moved frontward inside the second rack housing 126.

Consequently, the first rack bar 127 and the second rack bar 128 are simultaneously moved frontward by the hydraulic pressure supplied when the hydraulic pressure pump 122 is driven. The pinions 129 engaged with the respective rack bars 127 and 128 are rotated and the first hinge shaft 102*a* and the second hinge shaft 102*b* are simultaneously rotated, so that the first cover 101*a* and the second cover 101*b* are simultaneously opened. In addition, same as the embodiment illustrated in FIGS. 2 and 3, the covers 101*a* and 101*b* are integrally coupled to the hinge shafts 102*a* and 102*b*, respectively, and the end portion of the spray nozzle 105 is integrally coupled to each of the hinge shafts 102*a* and 102*b*, so that when each of the hinge shafts 102*a* and 102*b* is rotated, the spray nozzle 105 is also rotated in the rising direction and reaches the predetermined position of spraying the fire extinguishing agent.

FIG. 5 illustrates a state of the first rack bar 127 before moving frontward inside the first rack housing 125, the second rack bar 128 (not illustrated in FIG. 5) before moving frontward inside the second rack housing 126, the first cover 101*a* (not illustrated in FIG. 5) and the second cover 101*b* (not illustrated in FIG. 5) are closed, and the spray nozzle 105 is lying.

On the contrary, in FIG. 6, the first rack bar 127 is moving frontward inside the first rack housing 125, the second rack bar 128 (not illustrated in FIG. 5) is moving frontward inside the second rack housing 126, the first cover 101*a* and the second cover 101*b* are opened, and the spray nozzle 105 is raised.

Referring to FIG. 6, it can be seen that the first rack bar 127 is moving frontward to the right in the drawings compared to the state in FIG. 5. Although the second rack bar (reference numeral is 128 in FIG. 4) is not illustrated in FIG. 6, the second rack bar is also moved frontward by the hydraulic pressure supplied inside the second rack housing 126 through the second hydraulic pressure hose 123*b* from the first rack housing 125, and the second rack bar may be moved to the left direction in the drawings that is in an opposite direction to the first rack bar 127. As illustrated in drawings, a pressurizing portion is formed at the end portion of the first rack bar 127 so as to allow the hydraulic pressure supplied inside the first rack housing 125 to be acted on through the first hydraulic pressure hose 123*a* from the hydraulic pressure pump 122.

In addition, referring to FIG. 6, it can be seen that the first cover 101*a* and the second cover 101*b* are opened upward and the spray nozzle 105 is simultaneously rotated upward in the rising direction so that the spray nozzle 105 reaches to the predetermined angles of the position of spraying the fire extinguishing agent. As illustrated in drawings, at the each of the battery packs 10, the first hinge shaft 102*a* and the second hinge shaft 102*b* are simultaneously rotated by the driving device 120, so the first cover 101*a* and the second cover 101*b* open the inside space of the battery casing 11, and the spray nozzle 105 is raised at an inclination of approximately 45 degrees and is positioned at the predetermined position of spraying the fire extinguishing agent.

In this state, the fire extinguishing agent supplying device 140 is operated, and when the opening and closing valve 145 of the fire extinguishing agent supplying hose 144 connected with the battery pack 10 in which a fire occurs is opened, the fire extinguishing agent supplied from the fire extinguishing agent supplying device 140 is supplied to the spray nozzle 105 through the fire extinguishing agent supplying hose 144. Consequently, the fire extinguishing agent is sprayed inside the battery casing 11 through the spray nozzle 105 that is in a raised state by being moved upward of the battery casing 11 of the battery pack 10 in which a fire occurs.

At this time, the spray nozzle 105 is positioned to be spaced apart at least a predetermined distance from the fire that has occurred inside the battery casing 11, so that the fire extinguishing agent may be sprayed in a wide range to the battery module in the battery casing 11 and the battery cells. Therefore, the fire may be rapidly extinguished.

Figure 7:
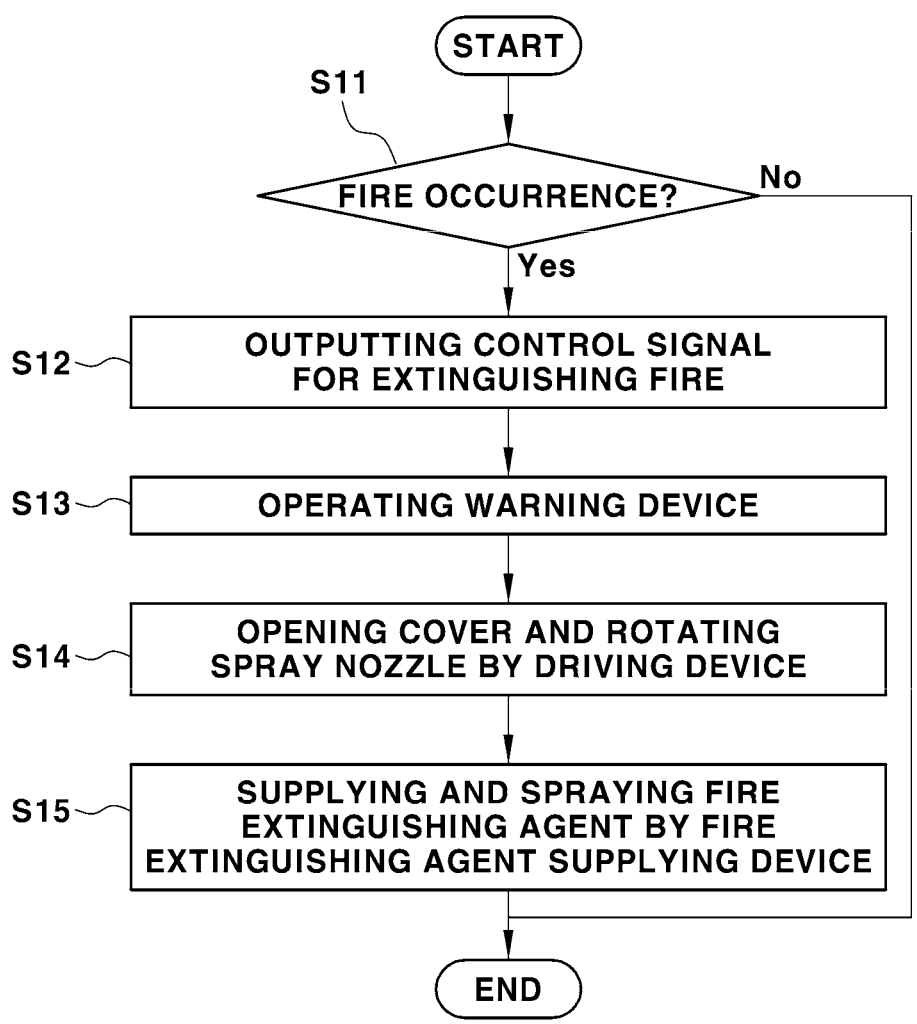
FIG. 7 is a flowchart illustrating an operating process of the fire extinguishing apparatus according to an embodiment of the present disclosure.

FIG. 7 is a flowchart illustrating an operating process of the fire extinguishing apparatus 100 according to an embodiment of the present disclosure. First, in the closed state of the covers 101*a* and 101*b* of the entire battery packs 10 and the opening and closing valve 145 is closed, when a fire detection signal (CAN signal) is transmitted to the controller 110 through a vehicle network from the fire detection sensor 109 installed on the battery pack 10 that the fire occurs, the controller 110 determines that the fire occurs at S11. Then, after the controller 110 checks the battery pack 10 to determine whether a fire occurs (in a case of the embodiment in FIGS. 4 to 6), the controller 110 generates a control signal for extinguishing the fire and outputs at S12.

Therefore, the warning device 150 is operated in response to the control signal output from the controller 110 so that the warning device 150 warns a driver of a situation of an occurrence of a fire at S13. In addition, the hinge shafts 102*a* and 102*b* of the covers 101*a* and 101*b* are simultaneously rotated by the driving device 120 being operated in response to the control signal output from the controller 110, and at this time, the covers 101*a* and 101*b* coupled to the hinge shafts 102*a* and 102*b* are rotated upward and opened and the spray nozzles 105 coupled to the hinge shafts 102*a* and 102*b* are simultaneously rotated upward and are raised at S14.

Then, the fire extinguishing agent supplying device 140 is operated in response to the control signal output from the controller 110, and the fire extinguishing agent is supplied through the fire extinguishing agent supplying hose 144 at S15. In the embodiment in FIGS. 4 and 6, only the opening and closing valve 145 at the battery pack 10 in which a fire occurs is selectively opened in response to the control signal output from the controller 110, and the fire extinguishing agent is supplied to the spray nozzle 105 only through the fire extinguishing agent 144 connected with the battery pack 10 in which a fire occurs.

Consequently, when the upper surface of the battery casing 11 is in the opened state, the fire extinguishing agent is sprayed with high pressure inside the battery casing 11 through the nozzle hole of the spray nozzle 105 raised above the upper surface of the battery casing 11, and the fire that has occurred on the battery module and the battery cells in the battery casing 11 may be extinguished by the fire extinguishing agent sprayed inside the battery casing 11.

When the operating state of the driving device 120 is described separately for each embodiment, in the embodiment in FIGS. 2 and 3, the motor 121 of the driving device 120 is driven in response to the control signal output from the controller 110. Since the motor 121 is driven, each of the hinge shafts 102*a* and 102*b* coupled to the rotary shaft of the motor 121 is rotated so that the covers 101a and 101b are opened and the spray nozzle 105 are simultaneously raised.

In addition, in the embodiment in FIGS. 4 to 6, the hydraulic pressure pump 122 of the driving device 120 is operated in response to the control signal output from the controller 110. Since the hydraulic pressure pump 122 is operated, the hydraulic pressure is supplied to the first rack housing 125 of the cooperation device 124 through the first hydraulic pressure hose 123a.

Accordingly, the first rack bar 127 is moved frontward inside the first rack housing 125 by the hydraulic pressure, and working oil is pressurized from the inside space of the outlet side of the first rack housing 125 by the first rack bar 127 that is moving frontward. In addition, when the working oil is pressurized at the inside space of the outlet side of the first rack housing 125 by the first rack bar 127 that functions as a piston, the hydraulic pressure is transferred to the second rack housing 126 through the second hydraulic pressure hose 123b by the working oil being pressurized. Consequently, the second rack bar 128 is moved frontward inside the second rack housing 126 by the hydraulic pressure transferred to the second rack housing 126.

As such, the pinions 129 engaged with the first rack bar 127 and the second rack bar 128 are rotated since the first rack bar 127 and the second rack bar 128 are simultaneously rotated inside the first rack housing 125 and the second rack housing 126, so the first hinge shaft 102a and the second hinge shaft 102b that are integrally mounted with the respective pinions 129 are simultaneously rotated.

Consequently, the first cover 101a and the second cover 101b are simultaneously opened as the first hinge shaft 102a and the second hinge shaft 102b are simultaneously rotated at the battery pack 10, and the spray nozzle 105 mounted on each of the hinge shafts 102a and 102b is also rotated upward until reaching to the predetermined inclination and to the position of spraying the fire extinguishing agent.

As such, the opening and closing valve 145 is opened when the spray nozzle 105 reaches the predetermined position of spraying the fire extinguishing agent, and when the fire extinguishing agent supplying device 140 is operated so that the fire extinguishing agent is supplied to the spray nozzle 105 through the fire extinguishing agent supplying hose 144, the fire extinguishing agent may be uniformly sprayed inside the battery casing 11 by the spray nozzle 105.

Hereby, according to the fire extinguishing apparatus of the present disclosure, since the fire extinguishing agent is directly sprayed inside the battery pack, the fire extinguishing performance may increase, and since the fire extinguishing agent is sprayed while the spray nozzle is in a state of being rotated upward, the fire extinguishing agent may be sprayed in a wider range compared to a situation that the spray nozzle is installed inside the battery pack.

When the spray nozzle is installed inside the battery pack, a mounting position of the spray nozzle is adjacent to the battery cells due to the configuration of the layout of the battery pack, so that a spraying angle and area of the fire extinguishing agent are small. On the contrary, in the present disclosure, the fire extinguishing agent is sprayed while the spray nozzle is raised after the covers are opened so that the fire extinguishing agent is efficiently sprayed in a wider range and in an optimal spraying angle, so that the fire extinguishing apparatus of the present disclosure has a very excellent performance of extinguishing a fire.

In addition, for the plurality of the battery packs, a structure capable of rapidly and simply opening the covers and capable of allowing the spray nozzle to be raised is applied by the hydraulic pressure pump and a rack-pinion gear structure, so that a fire may be quickly extinguished. In addition, it is capable to selectively supply and spray the fire extinguishing agent to the battery pack in which a fire occurs, so that a maximized performance of extinguishing the fire may be realized.

When a fire occurs in lithium-ion batteries that are widely used as conventional batteries for a vehicle, it is difficult to completely extinguish the fire after primary extinguishing of the fire. Therefore, when the fire extinguishing apparatus according to the present disclosure is applied for use of secondary extinguishing of the fire, the fire extinguishing agent may be easily and directly sprayed to the battery pack after the covers are opened while the secondary extinguishing of the fire is executed, so that excellent secondary extinguishing of the fire may be realized.

When the primary extinguishing of the fire is executed by using the spray nozzle installed inside the battery pack, a primary spraying angle when the fire extinguishing agent is sprayed is narrow, so that the fire extinguishing agent is not sprayed in a proper spraying range and it is difficult to extinguish the fire.

However, when the fire extinguishing apparatus according to the present disclosure is additionally applied the fire extinguishing agent may be uniformly sprayed in a wide range by rising the spray nozzle and opening the covers during a process of the secondary extinguishing of the fire after executing the primary extinguishing of the fire, so that the very effective extinguishing of the fire may be realized.

Although the exemplary embodiments of the present disclosure have been described in detail, the scope of the prevent disclosure is not limited to these exemplary embodiments, and various modifications and improvements devised by those skilled in the art using the fundamental concept of the present disclosure, which is defined by the appended claims, further fall within the scope of the present disclosure.

The invention claimed is:

1. A fire extinguishing apparatus of a vehicle, the fire extinguishing apparatus comprising:
    a cover mounted on a battery casing surrounding a battery cell of a battery pack of the vehicle, and the cover being configured to open and close the battery casing;
    a spray nozzle configured to be moved to a position of spraying a fire extinguishing agent, the position being capable of enabling the fire extinguishing agent to be sprayed inside the battery casing when the cover is in an open state;
    a fire detection sensor configured to detect a fire inside the battery casing;
    a controller configured to generate and output a control signal for extinguishing the fire when a fire is detected by the fire detection sensor;
    a driving device configured to open the cover in response to the control signal output from the controller, and configured to move the spray nozzle to the position of spraying the fire extinguishing agent; and
    a fire extinguishing agent supplying device configured to supply the fire extinguishing agent to the spray nozzle in response to the control signal output from the controller.

2. The fire extinguishing apparatus of claim 1, further comprising a warning device configured to warn of the occurrence of the fire in response to the control signal output from the controller.

3. The fire extinguishing apparatus of claim 1, wherein the cover is hinge-fastened to the battery casing via a hinge shaft such that the cover is rotated when the cover is opened, the hinge shaft being integrally fixed to and coupled to the cover, and the driving device being configured to rotate the hinge shaft to open the cover.

4. The fire extinguishing apparatus of claim 3, wherein the spray nozzle is coupled to the hinge shaft such that the spray nozzle is moved to the position of spraying the fire extinguishing agent by the hinge shaft that is rotated by the driving device.

5. The fire extinguishing apparatus of claim 4, wherein the spray nozzle is rotated and raised to the position of spraying the fire extinguishing agent when the hinge shaft is rotated in a state in which a lower end is integrally fixed to and coupled to the hinge shaft.

6. The fire extinguishing apparatus of claim 5, wherein the spray nozzle is configured to be rotated integrally with the hinge shaft until the spray nozzle reaches the position of spraying the fire extinguishing agent in which the spray nozzle is inclined with respect to the lower end portion, and a plurality of nozzle holes positioned at equal intervals along a longitudinal direction of the spray nozzle are configured to spray the fire extinguishing agent to uniformly spray the fire extinguishing agent inside the battery casing when the cover is open.

7. The fire extinguishing apparatus of claim 3, wherein the driving device comprises a motor configured to rotate the hinge shaft by operating in response to the control signal output from the controller.

8. The fire extinguishing apparatus of claim 7, wherein the cover comprises a first cover and a second cover each hinge-fastened to opposite sides of the battery casing via a corresponding hinge shaft, and
the motor comprises a first motor configured to rotate the hinge shaft coupled to the first cover and a second motor configured to rotate the hinge shaft coupled to the second cover.

9. The fire extinguishing apparatus of claim 3, wherein the driving device comprises:
a hydraulic pressure pump configured to supply hydraulic pressure in response to the control signal output from the controller;
a cooperation device configured to rotate the hinge shaft by the hydraulic pressure supplied from the hydraulic pressure pump; and
a hydraulic pressure hose connected to the cooperation device to supply the hydraulic pressure from the hydraulic pressure pump to the cooperation device.

10. The fire extinguishing apparatus of claim 9, wherein the cooperation device comprises:
a rack housing connected to the hydraulic pressure pump through the hydraulic pressure hose such that the hydraulic pressure is supplied inside the rack housing through the hydraulic pressure hose when the hydraulic pressure pump is driven;
a rack bar provided inside the rack housing to be rectilinearly movable therein by the hydraulic pressure supplied inside the rack housing; and
a pinion fixed to and mounted on an end portion of the hinge shaft inserted inside the rack housing, the pinion being engaged with the rack bar and configured to integrally rotate the hinge shaft by being rotated when the rack bar is rectilinearly moved.

11. The fire extinguishing apparatus of claim 10, wherein the spray nozzle comprises a plurality of spray nozzles and the battery pack comprises a plurality of battery packs, wherein a fire extinguishing agent supplying hose is connected to each of the plurality of spray nozzles of each of the plurality of battery packs from the fire extinguishing agent supplying device to deliver the fire extinguishing agent from the fire extinguishing agent supplying device to each of the plurality of spray nozzles provided at each of the plurality of battery packs.

12. The fire extinguishing apparatus of claim 11, wherein the cover comprises a first cover and a second cover and the battery casing comprises a first battery casing and a second battery casing, wherein the first cover is hinge-fastened to the first battery casing and the second cover is hinge-fastened to the second battery casing;
a first hinge shaft fixed to and coupled to the first cover and a second hinge shaft fixed to and coupled to the second cover, the first hinge shaft protruding outwardly from a first battery pack of the plurality of battery packs in a first direction, and second hinge shaft protruding outwardly from a second battery pack of the plurality of battery packs in a second direction, the first direction being the opposite to the second direction, and
the pinion comprises a first pinion fixed to and mounted on an end portion of the first hinge shaft, and a second pinion fixed to and mounted on an end portion of the second hinge shaft.

13. The fire extinguishing apparatus of claim 12, wherein the rack housing comprises a first rack housing connected to the hydraulic pressure pump through a first hydraulic pressure hose and a second rack housing connected to the first rack housing through a second hydraulic pressure hose, and
the rack bar comprises a first rack bar provided inside the first rack housing to be rectilinearly movable by the hydraulic pressure supplied inside the first rack housing through the first hydraulic pressure hose, and a second rack bar provided inside the second rack housing to be rectilinearly movable by the hydraulic pressure supplied inside the second rack housing through the second hydraulic pressure hose.

14. The fire extinguishing apparatus of claim 13, wherein the first pinion is engaged with the first rack bar, and the second pinion is engaged with the second rack bar.

15. The fire extinguishing apparatus of claim 11, wherein an opening and closing valve is installed on each of the fire extinguishing agent supplying hoses, and
the controller is configured to control opening and closing of each of the opening and closing valves to allow the fire extinguishing agent to be selectively supplied to one of the plurality of spray nozzles installed on one of the plurality of battery packs on which a fire is detected by the fire detection sensor.

* * * * *